United States Patent
Christensen et al.

(10) Patent No.: US 8,262,334 B2
(45) Date of Patent: Sep. 11, 2012

(54) SYSTEM FOR UNLOADING OR LOADING OF CARGO

(75) Inventors: Torben Christensen, Arden (DK); Rasmus Halfdan Breck, Copenhagen (DK); Jakob Thierry-Carstensen, Copenhagen (DK); Lars Højgaard Thøgersen, Copenhagen (DK)

(73) Assignee: Univeyor A/S, Arden (DK)

( * ) Notice: Subject to any disclaimer, the term of this patent is extended or adjusted under 35 U.S.C. 154(b) by 977 days.

(21) Appl. No.: 11/913,413

(22) PCT Filed: May 2, 2006

(86) PCT No.: PCT/DK2006/000239
§ 371 (c)(1),
(2), (4) Date: Oct. 2, 2008

(87) PCT Pub. No.: WO2006/117003
PCT Pub. Date: Nov. 9, 2006

(65) Prior Publication Data
US 2009/0074546 A1 Mar. 19, 2009

(30) Foreign Application Priority Data
May 2, 2005 (PA) .................................. 2005 00643

(51) Int. Cl.
*B65G 67/02* (2006.01)
(52) U.S. Cl. ...................... 414/398; 198/471.1; 198/581
(58) Field of Classification Search .................. 198/312, 198/313, 471.1, 581, 861.2, 861.4; 414/331.09, 414/398, 752.1
See application file for complete search history.

(56) References Cited

U.S. PATENT DOCUMENTS

| 3,225,879 | A | * | 12/1965 | Falcon et al. | 193/35 TE |
| 3,596,785 | A | * | 8/1971 | Weatherford, Jr. | 198/812 |
| 3,876,060 | A | * | 4/1975 | Stease | 198/632 |
| 4,281,955 | A | * | 8/1981 | McWilliams | 414/398 |
| 4,813,526 | A | * | 3/1989 | Belanger | 198/313 |
| 4,860,878 | A | * | 8/1989 | Mraz et al. | 198/309 |
| 5,256,021 | A | * | 10/1993 | Wolf et al. | 414/393 |
| 5,325,953 | A | * | 7/1994 | Doster et al. | 198/304 |
| 5,685,416 | A | * | 11/1997 | Bonnet | 198/812 |
| 5,697,753 | A | * | 12/1997 | Aurora et al. | 414/398 |
| 5,718,325 | A | * | 2/1998 | Doster et al. | 198/592 |
| 5,913,655 | A | * | 6/1999 | Maday | 414/797.2 |

FOREIGN PATENT DOCUMENTS

| JP | 61-211237 A | * | 9/1986 | 414/398 |
| JP | 62-157139 A | * | 7/1987 | 414/398 |
| JP | 62-191313 A | * | 8/1987 | 414/398 |

* cited by examiner

*Primary Examiner* — James Keenan
(74) *Attorney, Agent, or Firm* — Antonelli, Terry, Stout & Kraus, LLP.

(57) ABSTRACT

The present invention is a system (1) for unloading or loading cargo which for example is packed in boxes (16). The system includes first transport (5) with a handling apparatus (6) and a second longitudinally variable transport (8). The first transport (5) transports cargo (16) to and from the second transport (8). The handling apparatus (6) includes a conveyor (19) for transporting cargo (6) to or from the first transport (5). The handling apparatus (6) furthermore includes a movable handler (13) that interacts with the conveyor (19) and which engages the cargo (16).

17 Claims, 12 Drawing Sheets

SYSTEM FOR UNLOADING OR LOADING OF CARGO

BACKGROUND OF THE INVENTION

1. Field of the Invention

The present invention concerns a system for loading or unloading general cargo, for example cargo packed in boxes.

2. Description of the Prior Art

As the shipping rates on cargo in for example containers have dropped sharply during the last decade, it is now economically profitable for firms to produce cargo in a country where, for example the workforce is cheap, the expertise/know-how is found or the materials are readily accessible, and then subsequently to send the cargo to the country where the cargo is to be sold or used.

In order to fully utilize the capacity of for example a container, the producer has packed the cargo in a very compact way in the container. When the container is emptied at the recipient, problems may arise. It may for example be difficult to unload the cargo out of the container because the container has been packed very tightly, or because the individual piece of cargo may be very heavy or have an unmanageable shape so that it will require more than one person to lift the cargo. Hence, the unloading work is demanding in time and resources.

In order to solve the above problems by unloading for example a container, a trailer or a truck, various apparatuses may be used which entirely or partly can empty a container, a trailer or a lorry.

U.S. Pat. No. 5,524,747 describes a method and an apparatus for collecting packages where the apparatus includes a mobile frame with collecting means and a receiving table, and where the collecting means may rotate a package by means of a number of pressing members and/or conveyor belts, so that the conveyor belt can be inserted under the bottom of the package in order to move the package to the receiving table.

WO-A1-96/30287 describes a method and a mobile apparatus for mechanical unloading and loading of objects where the apparatus includes an approximately wedge-shaped insert means with a number of rollers and a conveyor belt. The insert means is pressed in under the object, and the rollers advance the object to the conveyor belt.

EP-A1-0571 084 describes an apparatus and a method for loading and unloading a transport container, where the apparatus includes a telescopic conveyor belt which at a front end is provided with a collecting arrangement in the shape of a gripper arm which is controlled by a person in the driver's cabin. Thereby, the gripper arm holds bags and/or packets and disposes of them on the inlet of the telescopic conveyor belt.

SUMMARY OF THE INVENTION

The present invention is a system for unloading or loading of general cargo, which system is to ensure a simple, efficient, easy and rapid handling of individual pieces of cargo, and where typically only one person is to be used for operating the system. This is achieved with a system where the handling apparatus furthermore includes a movable handling means that interacts with the conveyor and which by means of a number of engagement means is adapted for engaging the cargo.

In connection with using the term "conveyor" it is to be noted that a conveyor in the present invention may be conveyor belts, conveyor rollers or slide rails.

In connection with using the term "cargo" is to be noted that cargo in connection with the present invention may be boxes, bags, plastic packed products and/or items with at least one approximately flat surface.

In order to ensure an efficient, simple, easy and rapid handling of the individual pieces of cargo and to ensure that only one person is to operate the system, the system includes a first conveyor with a handling apparatus providing for removal of the cargo from the container or placing it in the container.

The system furthermore includes a second longitudinally variable transport conveying cargo to or from the first transport to or from a permanently installed conveyor in a receiving station of a company.

The first transport transports cargo to and from the second conveyor.

The handling apparatus includes a conveyor adapted to transport cargo to or from the first transport and includes a movable handling apparatus that interacts with the conveyor and which is adapted to engage the cargo.

In a preferred embodiment of the invention, the handling apparatus is arranged at an end part of a second longitudinally variable transport means so that cargo unloaded from the container is transported continuously from the handling apparatus and further on the first and second transports.

The movable handling apparatus interacting with the conveyor is movable so that a person standing beside the movable handling apparatus may readily move the movable handling apparatus in front of a piece of cargo and thereby cause engagement with the cargo.

In an embodiment of the present invention, the handling apparatus includes a number of engagement means which are adapted to engage the cargo so that the cargo can be securely moved by the handling apparatus.

The engagement means may be a vacuum controlled suction cup that attaches to a side of the cargo so that the cargo can be moved. Alternatively, the engagement means may be one or more conveyor belts, sticky plates, hooks, barbs or similar devices.

In order to pull a piece of cargo out of a tightly packed container, the engagement means of the movable handling apparatus attach to an end/side face of the cargo and hold tightly thereto, while the movable engagement apparatus are moving away and thereby pull the cargo out upon a conveyor.

In an embodiment of the invention, the movable handling apparatus is connected with a means for moving that moves the engagement means between an active engagement position at a front end of the conveyor and an inactive waiting position at a rear end of the conveyor.

In this way, it is possible to maintain the position of the handling apparatus while the means for moving moves the engagement means into an active engagement position, where they come to contact an end/side face of a piece of cargo. Subsequently, the means for moving is moved backwards in the direction of the conveyor so that the cargo is pulled out on the conveyor, which is then moving the cargo from the engagement means that are released simultaneously. In order that the cargo may pass the engagement means, the means for moving may be moved so that the engagement means are disposed in inactive waiting position at a rear end of the conveyor whereby the cargo can pass across the engagement means.

In an embodiment of the invention, the means for moving is disposed relative to the conveyor of the handling apparatus to divide the conveyor into two parts running at each side of the means for moving.

The means for moving may be a belt, a chain or a conveyor belt, which may be arranged at an underlying plane relative to the surface of the conveyor, so that the cargo is not transported across the means for moving and is supported by the surface of the conveyor instead.

If the means for moving is in the same plane as the surface of the conveyor, it is important that the means for moving has the same texture as the lateral surface of the conveyor. If the surface does not have the same texture as the lateral surface, it should have a very smooth surface upon which the cargo may slide without appreciable resistance. This ensures that the cargo is not damaged when moved across the conveyor/moving means.

In an embodiment of the present invention, the conveyor and means for moving are powered by the same drive unit which for example may be a motor so that they move with equal speed. In an alternative embodiment of the present invention, the conveyor and means for moving are each powered by their own drive unit so that they run with different speeds.

If the means for moving is running faster than the conveyor, the engagement of the engagement means with the cargo causes the cargo to be pulled in onto the conveyor. Only when the engagement means releases the engagement with the cargo does the conveyor co-act to further transport the cargo.

If the means for moving runs more slowly than the conveyor, the conveyor grips the cargo and assists in pulling the cargo out from the container and out upon the conveyor. Only when the engagement means disappears in an inactive waiting position is it possible for the cargo to be onwardly conveyed.

For easy and rapid unloading/loading of a container, a trailer or a truck, the handling apparatus of the invention is built as a mobile unit and includes a first conveyor with a free end which is movable in horizontal and vertical directions, and the handling apparatus is found at the free end.

The handling apparatus is a mobile unit, as for example, having wheels mounted on the handling apparatus. As a result, it is easy to move the handling apparatus preferably in the longitudinal direction of the container which depends on how far the unloading/loading of the cargo has advanced. The movable handling apparatus may thereby always be positioned most suitably in relation to the stacked cargo in the container.

The first conveyor is provided with a free end which is connected with the handling apparatus and which is movable in horizontal and vertical direction. As a result, the handling apparatus can be disposed in an arbitrary position in the container either in front of or at a side of a piece of cargo.

For easy and rapid operation, the handling apparatus may be provided with a handle so that a person can move it around in a vertical and a horizontal direction.

The handle of the handling apparatus permits a person to stand close to the handling apparatus in connection with unloading/loading of a container. This is an evident advantage, as secure positioning of the handling apparatus is achieved so that a secure grip is achieved for a piece of cargo, thereby reducing the risk of destroying the cargo during unloading/loading.

An alternative to the handling apparatus having a handle is for the first conveyor to be provided with motors that move the free end of the conveyor in horizontal and vertical directions. These motors may be connected to a control box which is connected by cable or wirelessly connected with the motors so that a person standing at the side of the handling apparatus may control the movement of the free end of the conveyor and thereby the handling means.

In an embodiment of the present invention, the handling apparatus is constructed as a mobile unit and includes a second conveyor interacting with the longitudinally variable transport means.

The first conveyor is used for offloading/collecting cargo with the handling apparatus and may, as mentioned, be moved in vertical and horizontal directions. In order to transport cargo to or from the first conveyor, the handling apparatus includes a second conveyor which interacts with the first conveyor at one end and interacts with the longitudinally variable transport at an opposite end.

In an embodiment of the present invention, the longitudinally variable transport includes a number of conveyor carriages. Each carriage is provided with a short conveyor and forms a link in the longitudinally variable transport.

Each conveyor carriage is designed with a conveyor that may be motorized, so that the cargo is moved on to the next conveyor, or it may be a downstream conveyor so that friction from the cargo causes moving of the conveyor, whereby the cargo is automatically moved on to the next conveyor.

A longitudinally variable transport may have a number of conveyors which are all motorized or have a combination of conveyors with a motor and conveyors without a motor. The length of the longitudinally variable transport depends on how many conveyors are connected in series.

It is important to ensure that a continuous and secure transport of the cargo occurs along a longitudinally variable transport means. In a longitudinally variable transport means combined with conveyors with a motor and conveyor without motor, the length of the cargo pieces or the power of the conveyor motors determines how many conveyors without a motor can be placed between conveyors with motors.

An alternative to using a longitudinally variable transport with a number of conveyor carriages is for example: a conveyor comprising a number of telescoping links for which the handling apparatus is connected with the outermost telescoping link; modular conveyors having a number of modules forming a transport path from the handling apparatus to a permanently installed conveyor; or a telescoping conveyor including a number of conveyor modules which are rolled up in a cabinet and connected with the handling apparatus. Such a conveyor is described in WO-A1-01/51356.

In order to adjust the length of a longitudinally variable transport, the longitudinally variable transport includes a number of conveyor carriages which are each designed with a short conveyor which forms a link in the longitudinally variable transport. The longitudinally variable transport includes a cabinet in which the conveyor carriages can be stacked in an inclining position.

As a result, the conveyor carriages which do not form the transport are stacked obliquely in a cabinet so that the cargo may be moved freely to or from a permanently installed conveyor and to or from the handling apparatus.

If the cabinet is open upwards, the conveyor carriages are designed so that the short conveyor is accessible along the end parts of the conveyor carriages. As a result, the stacked conveyor carriages may also be used for trans-porting cargo.

In order to transport the cargo to or from the longitudinally variable transport to or from a permanently installed conveyor, the cabinet is provided with a conveyor having one end interacting with the conveyor carriages. The conveyor in a preferred embodiment of the present invention is located at an upper side of the cabinet which forms a connecting link between conveyor carriages of the longitudinally variable transport and the permanently installed conveyor.

By using the upper side of the cabinet to move a conveyor, the minimum required length of the longitudinally variable transport is reduced, and the cargo furthermore conveys up to a level above the floor level. As a result, the cargo for example may be handled further with a permanently installed conveyor, sorted on a sorting table or subjected to similar processes.

All transitions between conveyor carriages, cabinet conveyors and/or the handling apparatus conveyors are designed so that the cargo, irrespectively of whether it is moved forward or backward by the conveyors, is not moved to pass a transition over an edge. An edge increases the risk that cargo is accumulated on the conveyors of the system, which may cause the cargo to be destroyed or fall off the conveyors.

In order for the system to take up as little space as possible when not in use, the handling apparatus is designed to be placed over the cabinet. This means that the system only takes up space that is equal in length to the width of the handling apparatus.

The receiving stations typically include several unloading or loading gates so that operation can occur with continuous flow of cargo/products is possible to and from the companies.

Depending on the number of unloading or loading gates, a system according to the present invention may be provided in front of each unloading or loading gate so that cargo can be transported to and from all unloading or loading gates at the same time.

If the receiving station of a company includes many unloading or loading gates, it may be a great expense if a system according to the present invention is disposed in front of each unloading or loading gate. The system of the invention may in a way known per se be adapted to be laterally displaced in relation to the unloading or loading gates, so that a system according to the invention may serve several unloading or loading gates.

In a preferred embodiment, the system according to the invention may be designed so that the handling apparatus includes a conveyor with a number of narrow conveyor belts and the means of moving have pivotable arms disposed between the conveyor belts. The arms include the engagement means in the form of suction cups at their outer ends. The system cups are arranged to assume an extended active position at the front end of the handling apparatus or an inactive portion downwardly pivoted under the conveyor belts.

The system according to the invention may furthermore have the pivotable arms for the suction cups mounted on a common transverse support arm and are pivotably mounted on a central pivoting shaft. The central pivoting shaft may be pivoted by control wires connected to opposing ends of the common support arm and to peripheral points of a turning disc at the rear end of the first transport means. In a very simple way the suction cups are always correctly directed forward, for example also even if the handling apparatus is pivoted relative to sidewalls of, for example, a container.

It may be further advantageous that the handling apparatus is provided at a sectionally divided front edge with narrow positively driven rollers which are suspended on a curved shaft which are driven by connection with a number of the conveyor belts.

The system according to the invention positions springs to be interposed between the suction cups and the pivotable arms so that suction cups are functionally divided into groups that may be each connected to a vacuum source.

The system according to the invention is preferably designed so that the longitudinally variable conveyor includes a number of rolling conveyors which at a rear end are provided with legs with travel wheels, and which at a front end are provided with a support roller which interacts with inclining rails running upwardly/forwardly and which are arranged to support the front end of the rolling conveyors.

BRIEF DESCRIPTION OF THE DRAWINGS

The invention is explained below with reference to the drawing, where.

DETAILED DESCRIPTION OF THE INVENTION

Figure 1:
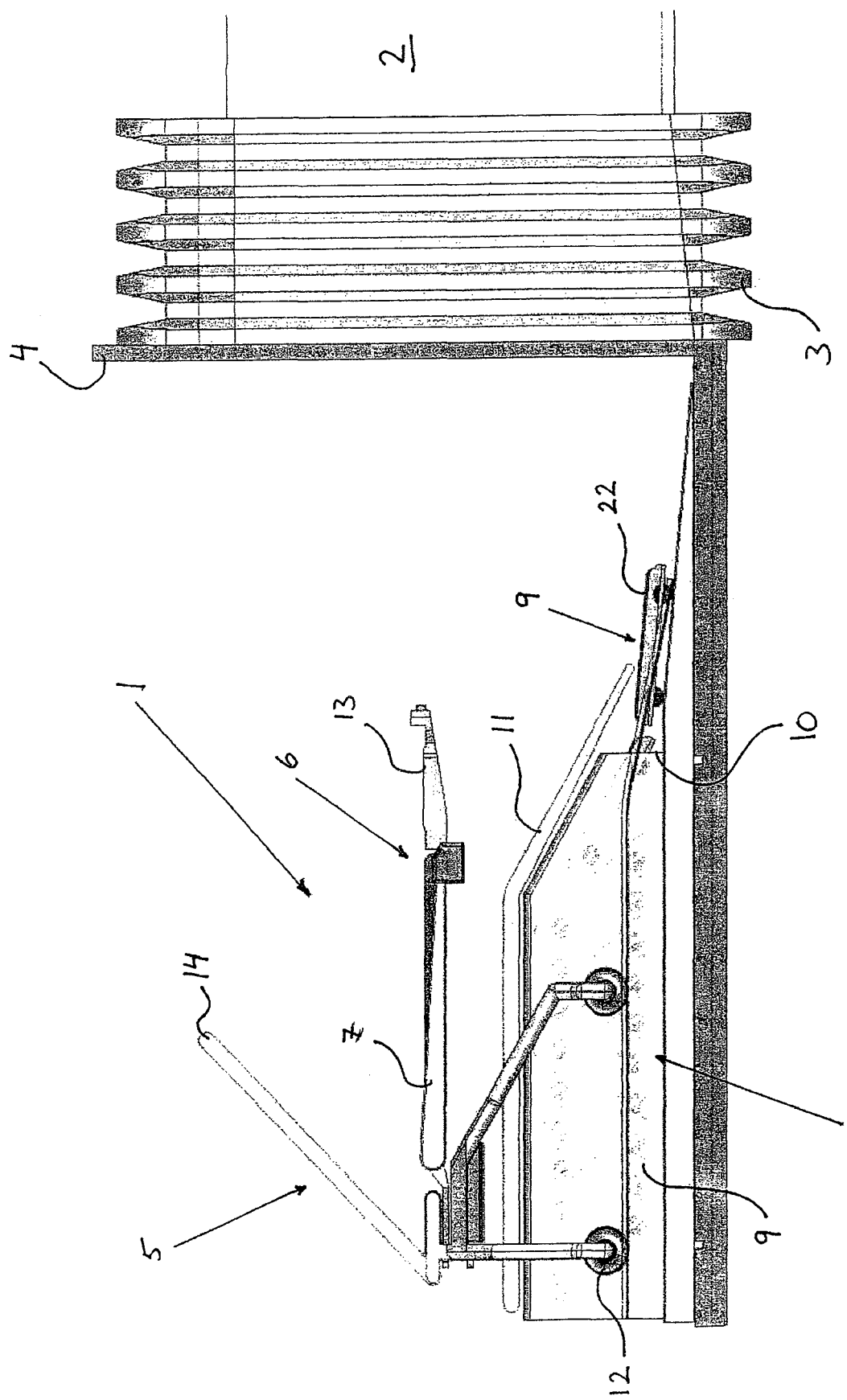
FIG. 1 shows a side view of an embodiment of a system according to the invention.

FIG. 1 shows a system 1 in an inactive position. The system 1 is disposed opposite a container 2 which is arranged via bellows 3 in front of a loading/unloading gate 4. The system 1 includes a mobile first transport 5 with a handling apparatus 6 including a conveyor belt 7 for transporting cargo (not shown) to or from the first transport 5. The system 1 furthermore includes a second longitudinally variable transport 8 which includes a number of transport carriages 9, a cabinet 10 and an upper conveyor 11, where the unused transport carriages 9 are stacked to be inclined in the cabinet 10. The first transport 5 is mobile and provided with wheels 12 and arranged so that the first transport 5 in an inactive position can be placed across the cabinet 10. The handling apparatus 6 includes a movable handling apparatus 13 that interacts with the conveyor belt 7 and engages a piece of cargo (not shown). The handling apparatus 6 further includes a pivotable conveyor belt 14 which is raised in the inactive position. The conveyor carriages 9 are each provided with a short conveyor 22.

Figure 2:
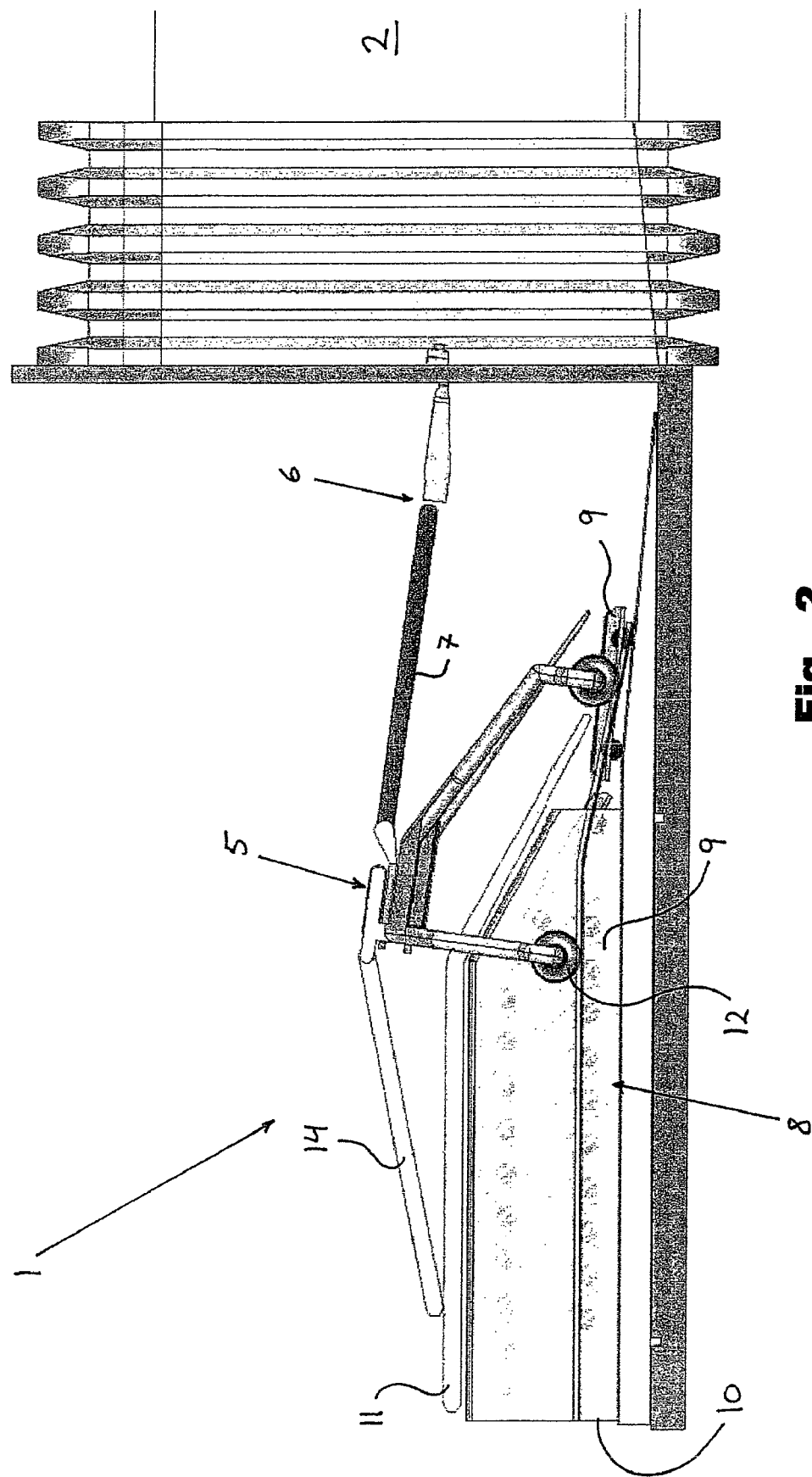
FIG. 2 shows a side view of the system shown in FIG. 1 in another operative situation.

FIG. 2 shows system 1 where the first transport 5 is rolling into the container 2. The pivotable conveyor belt 14 is lowered and interacts with the upper conveyor 11 on the cabinet 10. The second longitudinally variable transport 8 is not yet put into use and the conveyor carriages 9 are therefore stacked to be inclined in the cabinet 10.

Figure 3:
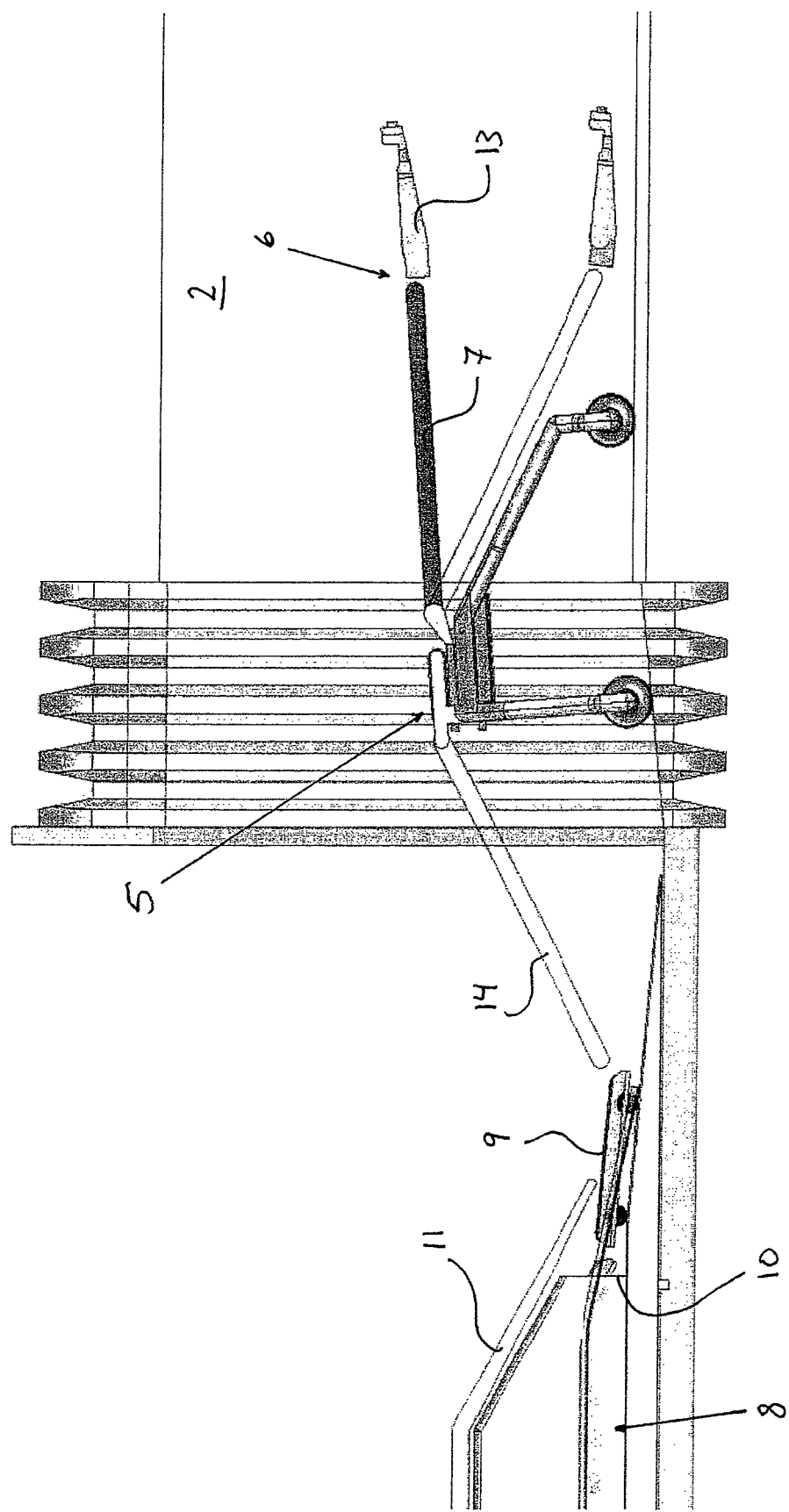
FIG. 3 shows a side view of a system, relative to FIG. 1, shown partly inserted into a container.

FIG. 3 shows system 1 where the first transport 5 is disposed in the container 2. The pivotable conveyor belt 14 interacts with the forward most conveyor carriage 9 of the second longitudinally variable transport 8. The forward most conveyor carriage 9 interacts with the upper conveyor 11 on the cabinet 10, so that a piece of cargo can be transported continuously to and from the first trans-port 5 via the forward most conveyor carriage 9 and the upper conveyor 11. The handling apparatus 5 is constructed as a mobile unit and includes a first conveyor 7 with a free end which is movable in horizontal and vertical directions, and a handling apparatus 13 is provided at the free end.

Figure 4:
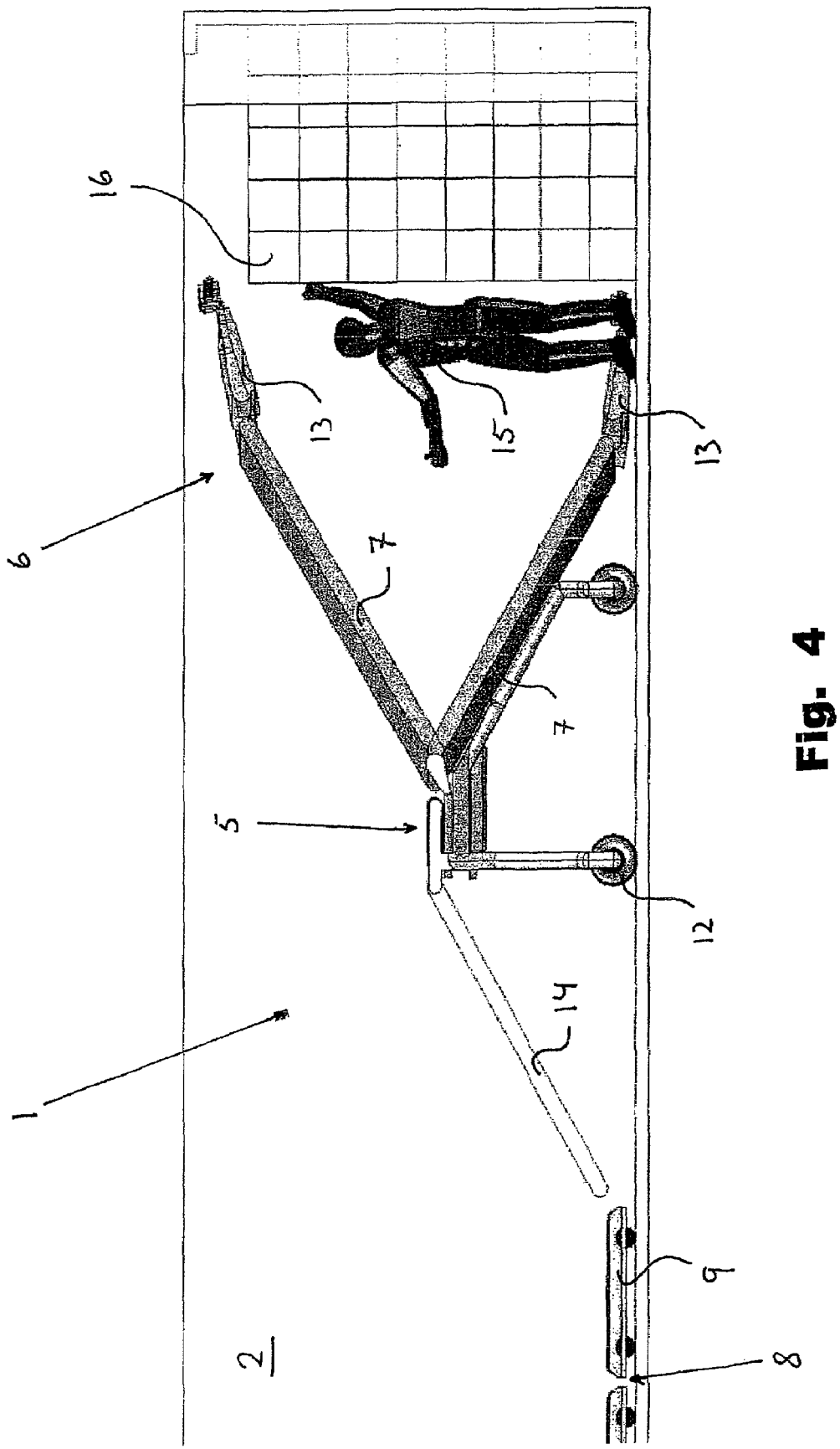
FIG. 4 shows a side view of a system, relative to FIG. 1, shown further inserted into a container.

FIG. 4 shows a system 1 where the first transport 5 is placed in the container 2, and where a person 15 is standing beside the first transport 5 and moves the first conveyor 7, so that handling apparatus 13 can be placed opposite a piece of cargo 16.

Figure 5:
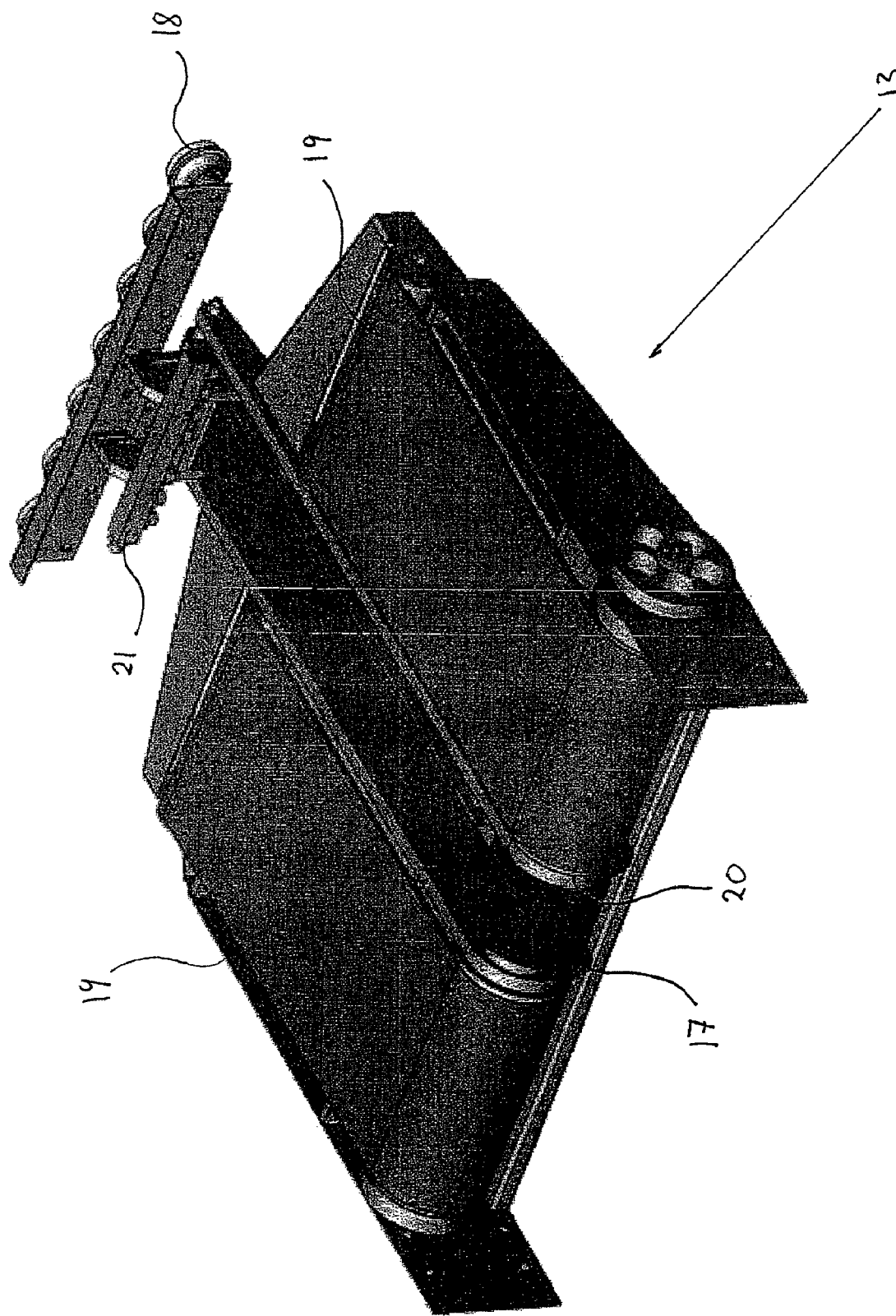
FIG. 5 shows a perspective view of an embodiment of a handling means for a system according to the invention which is shown with the suction cups in foremost active position.

FIG. 5 shows a handling apparatus 13 which includes a means for moving 17 on which engagement means 18 are arranged. which is shown in an active engagement position at a forward most end of a split conveyor 19. The means for moving 17 may move engagement means 18 back along the split conveyor 19 via tracks 20. Engagement means 18 are shown as suction cups provided with vacuum from manifold 21.

Figure 6:
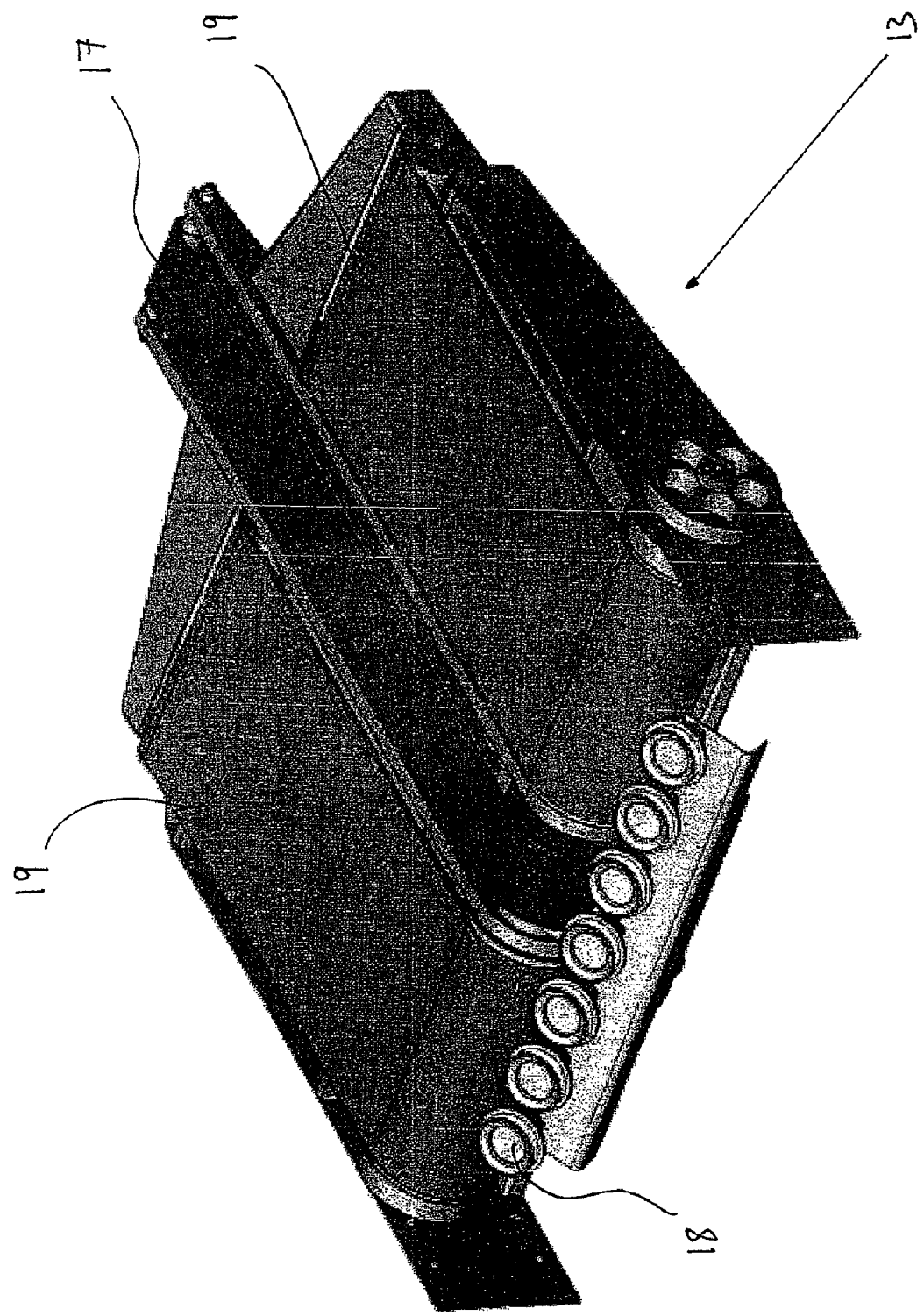
FIG. 6 shows a perspective view of a handling means, relative to FIG. 5, which is shown with the suction cups in an inactive and retracted position.
Figure 7:
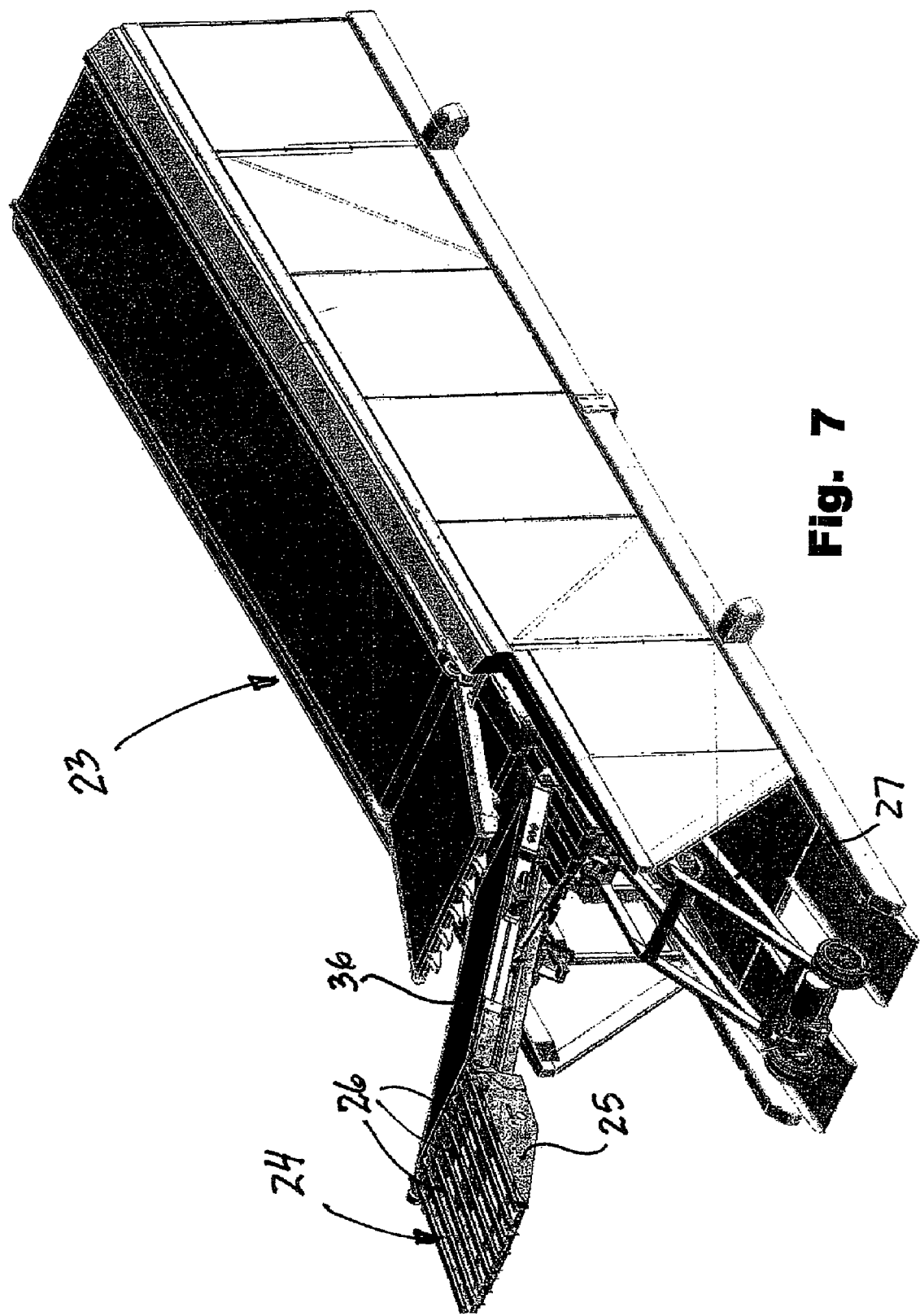
FIG. 7 shows a perspective view of a preferred embodiment of a system according to the invention.

FIG. 6 shows a handling means 13 where the moving means 17 have moved engagement means 18 into inactive waiting position at the rear end of the two-part conveyor 19. In this position cargo (not shown) can be moved past the engagement means 18.

In the preferred embodiment of a system 23 according to the invention shown in FIGS. 7-14 it appears clearly that a handling apparatus 24 includes a handling apparatus in the form of a conveyor 25 with a number of narrow conveyor belts 26. The means for moving pivotable arms 27 interposed between the conveyor belts 26. The outer ends of the arms 27 include engagement means in the form of suction cups 28 which assumes an advanced active position (FIGS. 11, 12) at the front end of the handling apparatus 24, or and inactive down-wards pivoted position (FIG. 13) down under the conveyor belts 24.

To automatically control the direction of the pivotable arms 17 for the suction cups 28, the pivotable arms 27 are mounted on a common transverse support arm 29 which is pivotably mounted on a central pivoting shaft. The support arm 29 is adapted to be angled (pivoted) by means of control wires connected with opposing ends of the common support arm 29 and with peripheral points of a turning disc at a rear end of the first transport means 5 and 7.

The common support arm 29 is moved back and forth in the handling apparatus 29 by drive belts (not illustrated) arranged along opposing inner sides of the handling apparatus 24. The pivoting movement of the common support arm 29 for suction cups 28 in relation to the top side plane of the handling apparatus 24 is provided by a common electric motor (not illustrated) with a belt drive.

Figure 8:
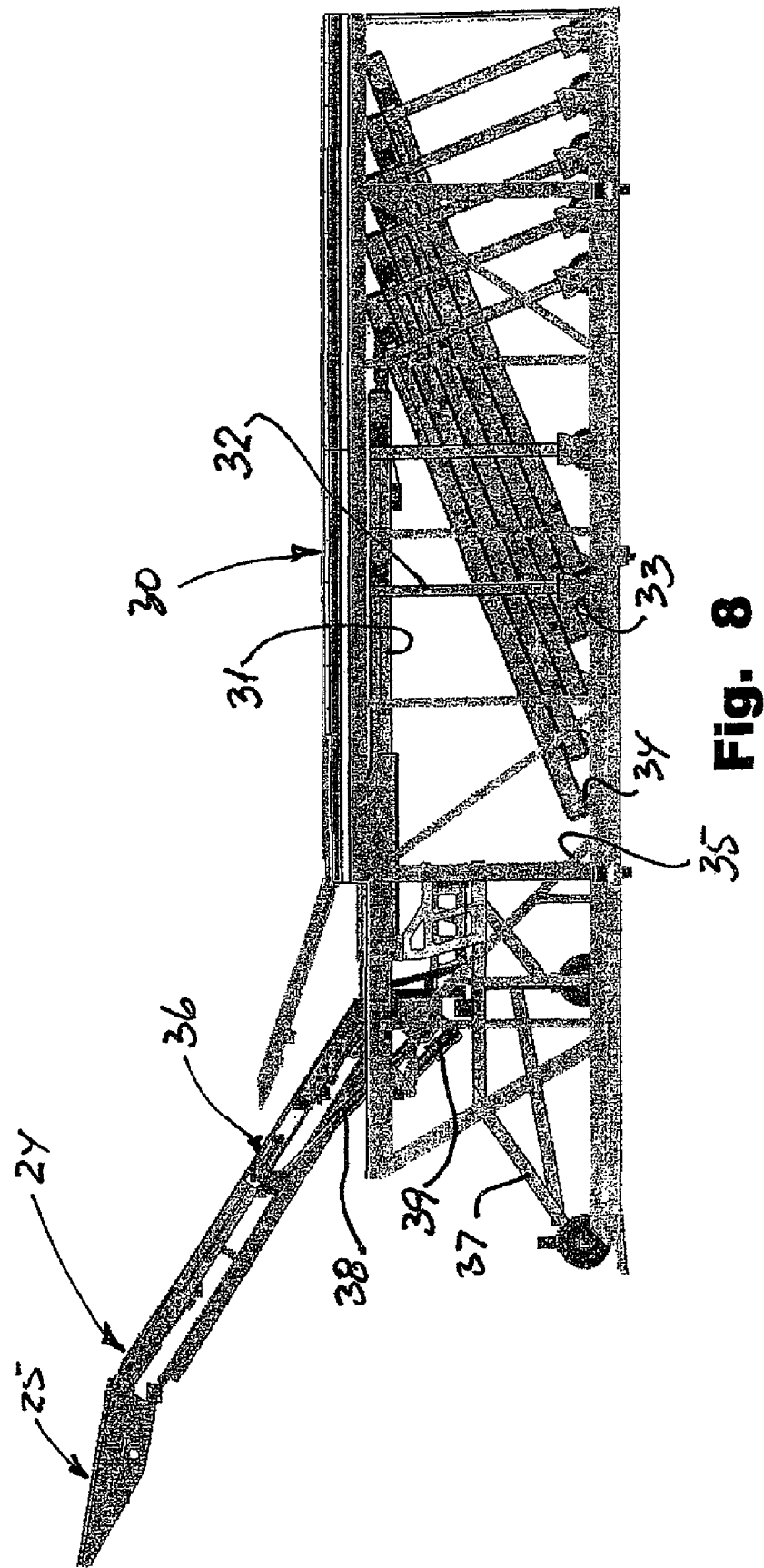
FIG. 8 shows a simplified side view of the system according to the invention shown in FIG. 7.

As it appears from FIG. 8, the second transport 30 has a number of conveyors 31 which at a rear end are provided with legs 32 and travel wheels 33. At a front end of the second transport support rollers 34 are provided which interact with inclining rails 35 extending upwards/forwards which support the front end of the rolling conveyors 31.

Figure 9:
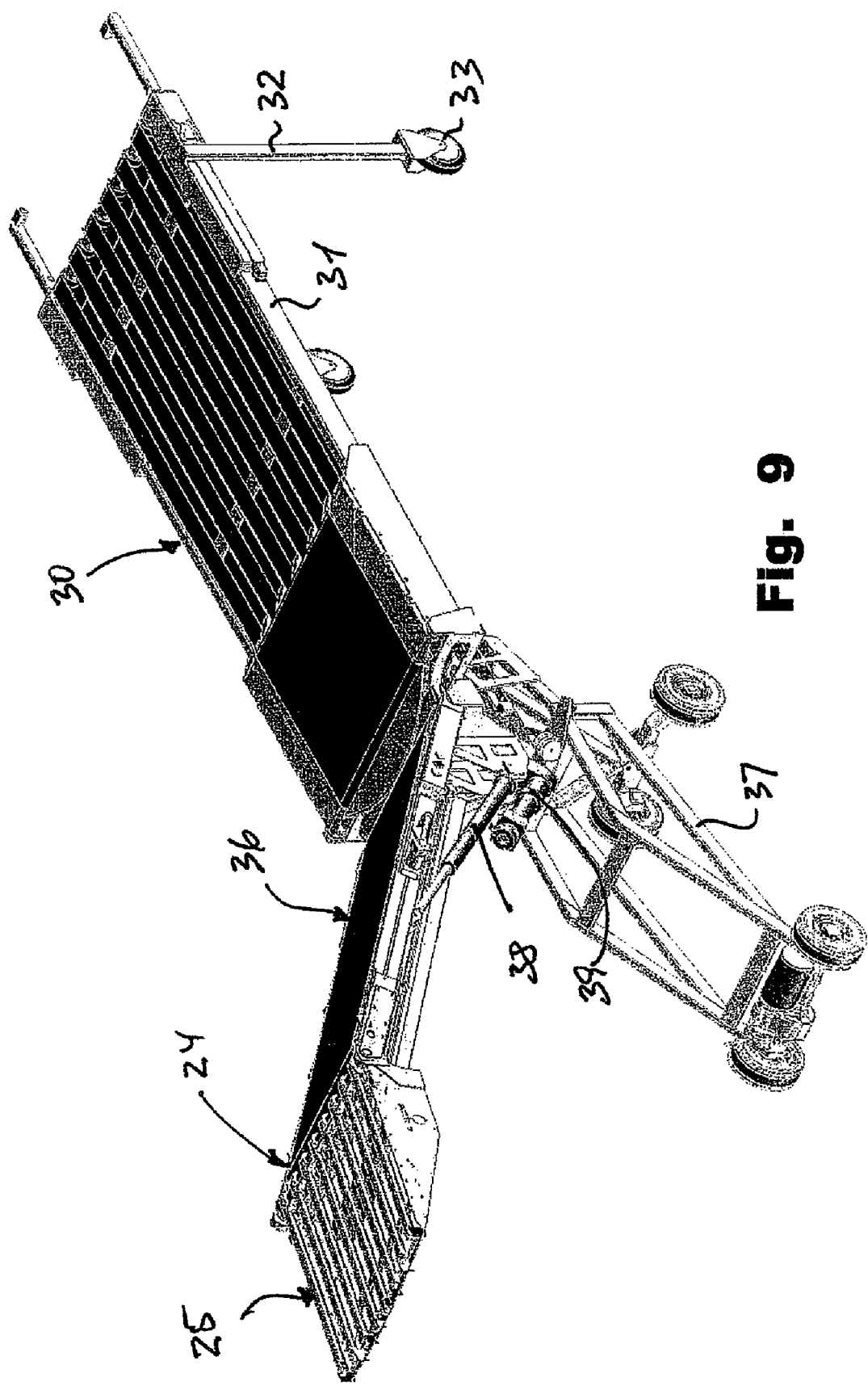
FIG. 9 shows a perspective view of a front part of the system according to the invention shown in FIG. 6.
Figure 10:
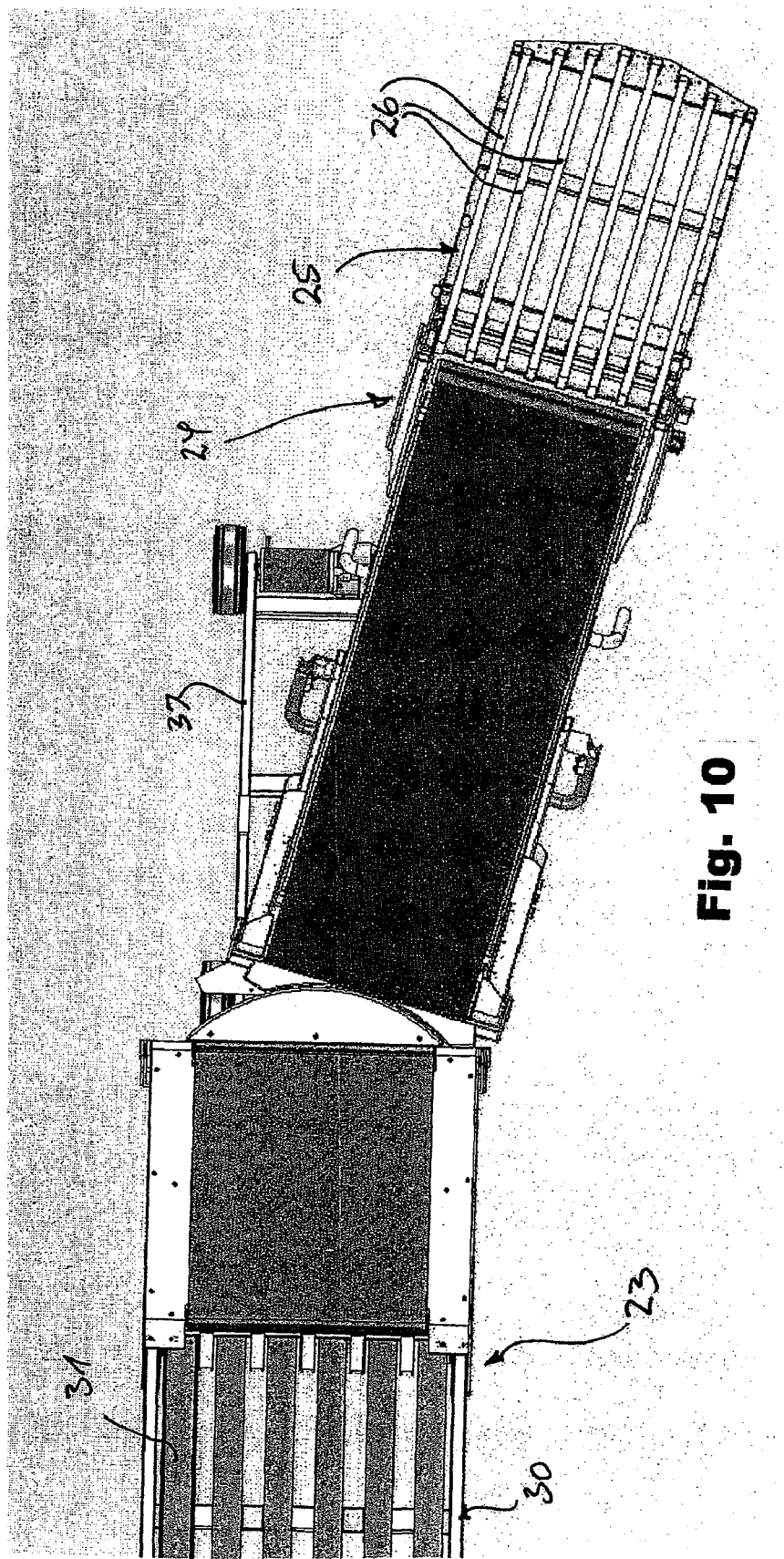
FIG. 10 shows a plan view of the system according to the invention shown in FIG. 6, as seen from above with a front part of the system turned to the right.
Figure 11:
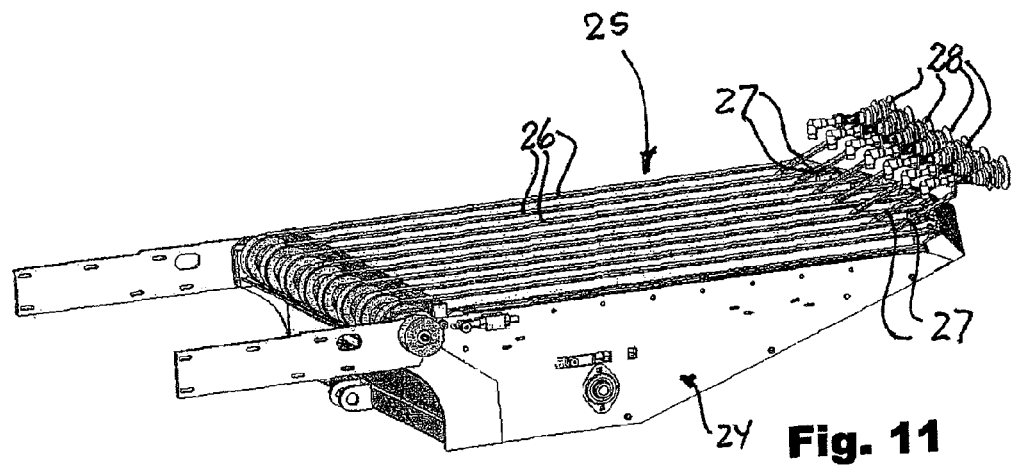
FIG. 11 shows a perspective side view of the handling apparatus for a system according to the invention.
Figure 12:
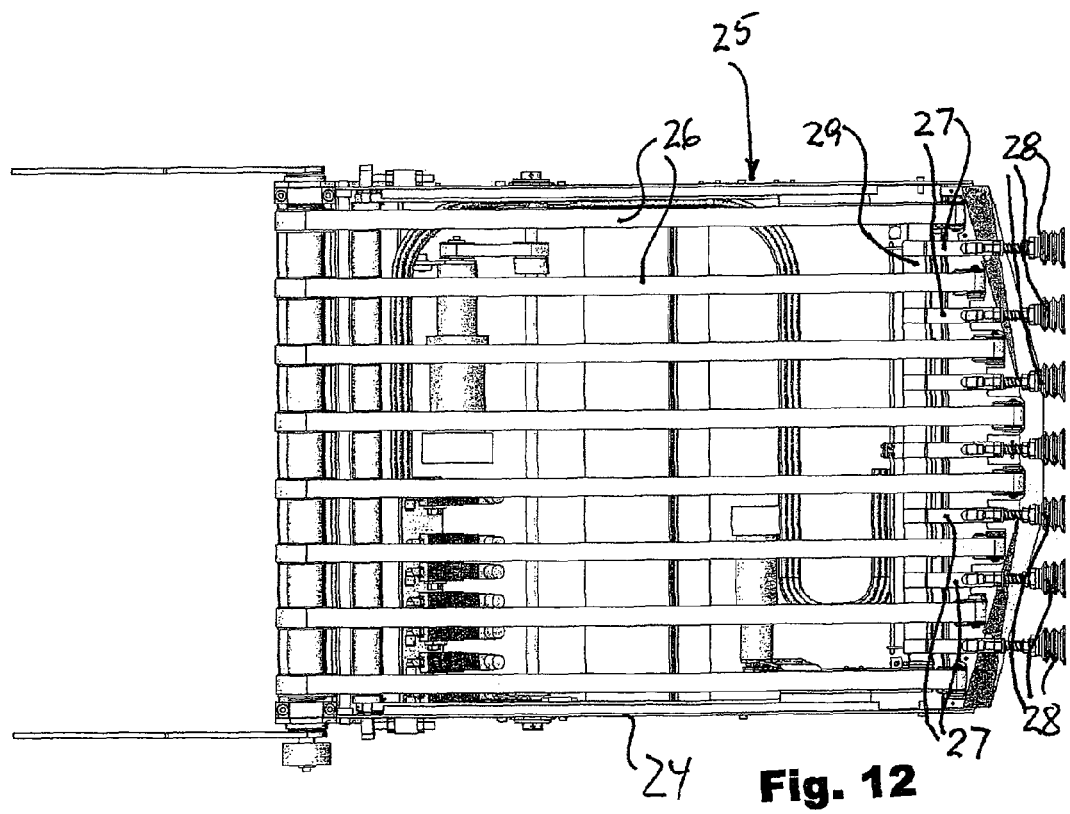
FIG. 12 shows a plan view of the handling apparatus which is relative to FIG. 11.
Figure 13:
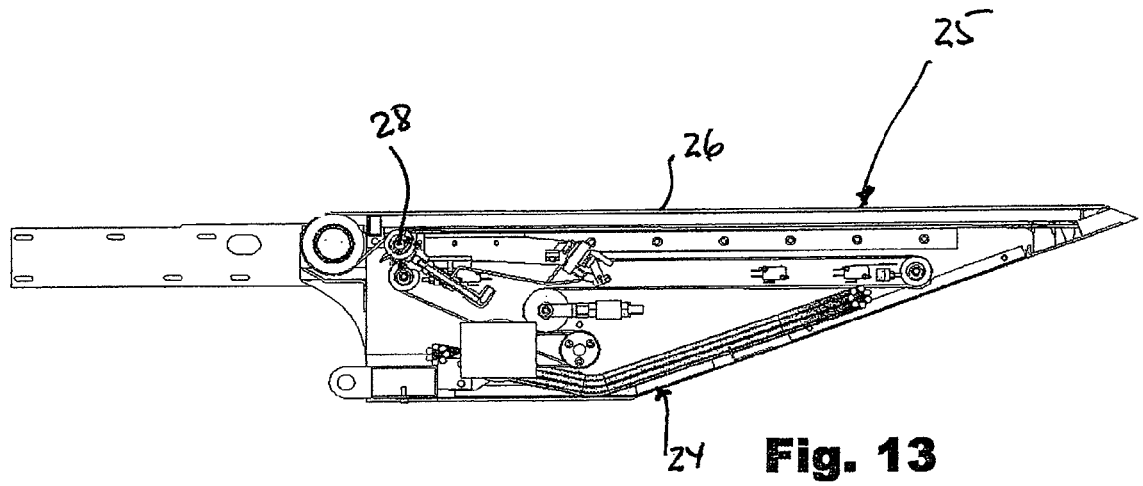
FIG. 13 shows a side view, partly in section, of the handling apparatus, relative to FIG. 11.

From FIGS. 9 and 10 it is clearly seen that the handling apparatus 24 interacts at the rear with a belt conveyor 36, which is rigidly connected laterally with the handling apparatus 24 which follows its pivoting movement both in a vertical and a horizontal direction. The handling apparatus 24 may be elevated in relation to a carriage frame 37 by a strong spindle unit 38 with associated electric gear motor 39.

Figure 14:
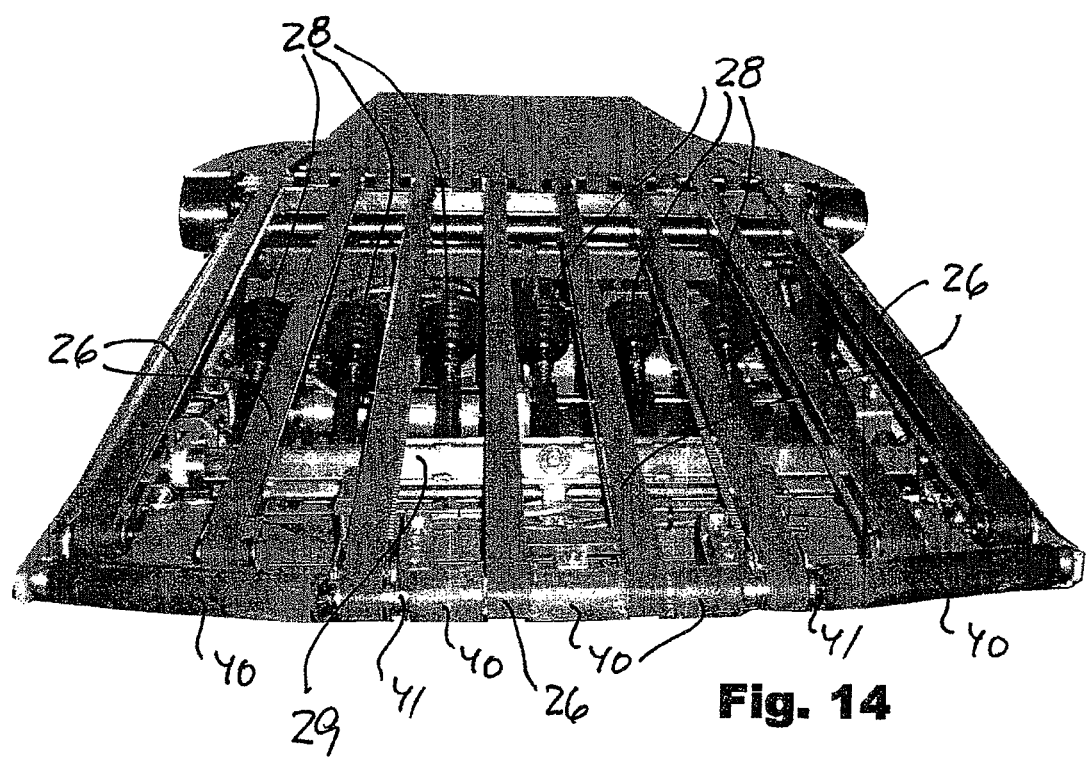
FIG. 14 shows a perspective view of the handling apparatus, relative to FIG. 11.

As it most clearly appears from FIG. 14, at a most forward position, a sectionalized of edge the handling apparatus 24 is provided with actively powered, narrow rubber rollers 40, which are mounted on a co-driven shaft 41 which is drivingly connected with at least the two central conveyor belts 26, for assisting holding cardboard boxes placed on the floor of a container.

The invention claimed is:

1. A system for unloading or loading packed cargo, comprising a first transport including a handling apparatus and a second longitudinally variable transport, the first transport transporting the packed cargo to and from the second transport, the handling apparatus for transporting cargo to or from the first transport and wherein:
   the handling apparatus includes a conveyor including conveyor belts, a movable means for handling that interacts with the conveyor, engagement means for engaging the cargo, and pivotable arms disposed between the conveyor belts, and wherein the engagement means comprises suction cups at outer ends thereof, the cups assuming an extended active position at a front end of the handling apparatus or an inactive position downwardly pivoted under the conveyor belts.

2. A system according to claim 1, wherein the handling apparatus comprises a rolling unit with travel wheels and a free end, which is movable in a horizontal and a vertical direction, and the means for handling is disposed at the free end.

3. A system according to claim 2 including another conveyor interacting with the second longitudinally variable transport.

4. A system according to claim 3, wherein the second longitudinally variable transport includes rolling conveyors with each rolling conveyor being within the second longitudinally variable transport, and the rolling conveyors being grouped together in mutually inclining positions when not in use.

5. A system according to claim 3, wherein the pivotable arms for the suction cups are mounted on a common transverse support arm which is pivotably mounted on a central pivoting shaft.

6. A system according to claim 2, wherein the second longitudinally variable transport includes rolling conveyors with each rolling conveyor being a conveyor within the second longitudinally variable transport, and the rolling conveyors are grouped together in mutually inclining positions when not in use.

7. A system according to claim 2, wherein the pivotable arms for the suction cups are mounted on a common transverse support arm which is pivotably mounted on a central pivoting shaft.

8. A system according to claim 1, including another conveyor interacting with the second longitudinally variable transport.

9. A system according to claim 8, wherein the second longitudinally variable transport includes rolling conveyors with each rolling conveyor being within the second longitudinally variable transport, and the rolling conveyors being grouped together in mutually inclining positions when not in use.

10. A system according to claim 9, wherein the pivotable arms for the suction cups are mounted on a common transverse support arm which is pivotably mounted on a central pivoting shaft.

11. A system according to claim 8, wherein the pivotable arms for the suction cups are mounted on a common transverse support arm which is pivotably mounted on a central pivoting shaft.

12. A system according to claim 1, wherein the second longitudinally variable transport includes rolling conveyors with each rolling conveyor being within the second longitudinally variable transport, and the rolling conveyors are grouped together in mutually inclining positions when not in use.

13. A system according to claim 12, wherein the pivotable arms for the suction cups are mounted on a common transverse support arm which is pivotably mounted on a central pivoting shaft.

14. A system according to claim 1, wherein the pivotable arms for the suction cups are mounted on a common transverse support arm which is pivotably mounted on a central pivoting shaft.

15. A system according to claim 1, wherein the handling apparatus includes a sectionally divided front edge at which positively driven rollers are disposed which are suspended on a shaft and which are drivingly connected to the conveyor belts.

16. A system according to claim 1, wherein the suction cups are divided into groups which are connectable to a vacuum source.

17. A system according to claim 1, wherein the second longitudinally variable transport includes rolling conveyors which at a rear end are provided with legs with travel wheels and which at a front end are provided with a support roller which interacts with inclining rails running upwards or forwards and which support the front end of the rolling conveyors.

* * * * *